United States Patent [19]

Ballard

[11] Patent Number: 5,299,378
[45] Date of Patent: Apr. 5, 1994

[54] FISHING LURE

[76] Inventor: Trevor J. Ballard, 5831 N. Ava St., Kansas City, Mo. 64151

[21] Appl. No.: 40,914

[22] Filed: Jun. 10, 1993

[51] Int. Cl.[5] ............................................. A01K 85/00
[52] U.S. Cl. .................................... 43/42.06; 43/42.1; 43/42.15
[58] Field of Search ................. 43/42.28, 42.39, 42.36, 43/42.02, 42.06, 42.1, 42.11, 42.15, 42.24, 42.29

[56] References Cited

U.S. PATENT DOCUMENTS

| | | | |
|---|---|---|---|
| 1,144,756 | 6/1915 | Damsma | 43/42.36 |
| 1,454,820 | 5/1923 | Readle | 43/42.28 |
| 2,261,068 | 10/1941 | Mackovich | 43/42.29 |
| 2,794,288 | 6/1957 | Marshall | 43/42.11 |
| 4,744,167 | 5/1988 | Steele | 43/42.1 |
| 4,831,770 | 5/1989 | Dworski | 43/42.28 |
| 5,094,026 | 3/1992 | Correll | 43/42.15 |

FOREIGN PATENT DOCUMENTS 0163584  6/1955  Australia ............................. 43/42.36

Primary Examiner—Paula A. Bradley
Assistant Examiner—James Miner
Attorney, Agent, or Firm—A. Donald Messenheimer

[57] ABSTRACT

A fishing lure which has the appearance and feel of a bait fish for attracting and hooking fish and preventing the line from breaking when a fish has been hooked. The lure may comprise a hollow, soft plastic, tubular shaped body or sheath 14 into which a spring 30, swivel 32, sponge 24 and weight system 22 are encased. An eyelet 10 extends from the front of the internal part of the lure for attaching to the fishing line. The eyelet 10 is connected internally to a cone-shaped weight 22 by a rod or wire 28 which extends through the weight 22 and is in turn connected to a spring 30 and swivel 32 combination. The opposite end of the spring and swivel combination is connected to a single treble hook 12. This mechanism excluding the weight and the hook is encased in a cylindrically shaped sponge 24 which in turn is encased in the hollow sheath which extends also over the weight 22 and has a fringed skirt 20 into which the hook extends.

7 Claims, 1 Drawing Sheet

FISHING LURE

FIELD OF INVENTION

This invention relates to fishing lures having a realistic appearance and feel like that of a bait fish while incorporating features such as the lead weight, swivel and spring in series as an internal part of the lure which carries a hook at a traditional trailing position.

BACKGROUND

The fishing lure of the present invention is for facilitating the catching of fish and is adapted for use in angling. The fishing line itself is wound on the reel of a fishing rod at one end. The loose end of the line is strung through the eyes of the fishing rod and is tied to the eye of the lure at its leading end. Fishing lures of this general type are disclosed in U.S. Pat. Nos. 3,693,275 to Craig; 3,037,315 to Klawitter; 3,006,102 to Chapman; 2,979,849 to Anderson; 2,964,870 to Dishon; and 1,538,658 to Rindt.

When an angler prepares to catch a fish, he first selects a lure that not only will be compatible with the type of fish he will be trying to catch, but also will advantageously attract the fish. Frequently a fish attractant is sprayed onto the trailing end of the lure, thereby increasing realistic qualities of the lure. The angler then makes a cast into the water and begins the process of retrieving the lure by using the reel to wind the line and attract the fish by motion of the lure.

Since fish have a very sophisticated sense of smell, scent added to the lure that closely resembles the smell of live fish bait is helpful in attracting fish to such lure. Once attracted to the lure, a fish will on occasion inhale the lure. Often, if the lure does not feel realistic to the fish, the fish will spit the lure out and escape without being hooked. A lure with a feel of a bait fish has a greater chance of catching a fish because it reduces the likelihood that the lure will be spit out or expelled by the fish.

SUMMARY OF THE INVENTION

It is an object of the present invention to provide an improved lure which is characterized by having a length and shape generally that of a bait fish, and which has an outer sheath of a soft plastic material that provides a feel of bait fish flesh.

The invention is also characterized by having those components desirably used by anglers which include means for allowing the hook to swivel and optionally a coil spring for absorbing some of the shock loading on the fish line after a fish has been hooked. Once the fish is hooked by the lure, it will thrash about wildly. This thrashing will often cause added stress to the line and may result in line breaking. A spring and swivel system located inside the lure can absorb some of the abuse that the fish exerts on the fishing line. A spring yields to the pulls of the fish and a swivel facilitates the twisting action. It is in this stage of fishing that a line is most susceptible to breakage and a lure with a swivel and a spring increases the chances of successfully landing a fish.

A specific feature of the present invention is that the basic components that are normally used, including the weight, the swivel, the spring and the hook are all within the confines of the lure. Under the outer sheath I have found that the use of a soft, porous sponge-like material enhances the bait fish feel resemblance in that the inwardly lying spring feels like a rib cage and the swivel feels like the spine. The head extends forwardly of the sponge and is uncovered except for the outer sheath to thereby give a feel resembling that of a bait fish skull. The porous material is a convenient receptor for the attractant liquid at a location near the hook, and the trailing strands of the outer sheath material may form a skirt which will cover the hook.

These and other objects and features of the invention will become more fully apparent from the claims and from the description as it proceeds in connection with the appended drawings.

DETAILED DESCRIPTION OF PREFERRED EMBODIMENTS

Figure 1:
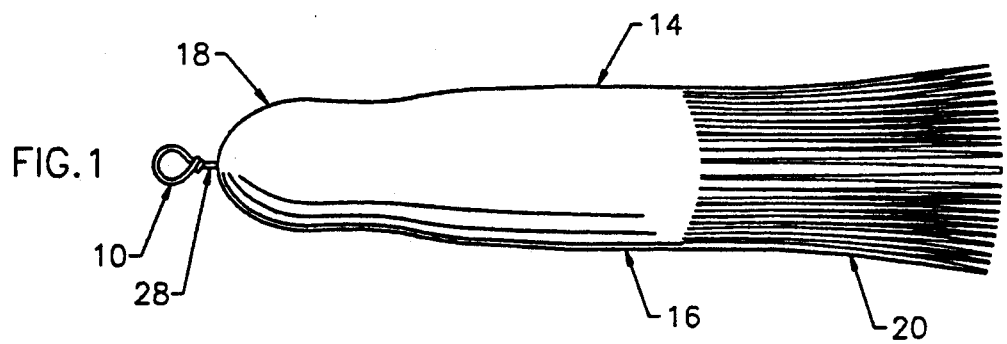
FIG. 1 is an external view of a fishing lure according to the present invention.

The fishing lure of the present invention is illustrated in FIG. 1 and may be provided with a wire loop 10 which is adapted to be attached to a fishing line. The hook 12 (see FIGS. 2-4) is somewhat obscured by the trailing end of the lure outer sheath 14. Sheath 14 is in the form of a sleeve preferably with a closed leading end thereby forming a sock having a main body portion 16 which is a soft, non-porous synthetic resin or plastics material that has the feel and appearance of bait fish flesh. The material should be tough to avoid being cut by the mouths of fish which may attack the lure, flexible and somewhat stretchable. Such plastics materials are available commercially in the form of a sock or sleeve and customarily used by those who make their own jigs or lures. The leading end 18 of the sheath 14 is preferably closed and punctured by the wire 28 from which the loop 10 is formed.

The sheath 14 is preferably about 4 or 5 inches in length and customarily has a diameter of somewhat less than an inch and stretchable to an inch. With a 5 inch lure as is illustrated to scale in the drawings, the lure has the shape and overall appearance of a bait fish. The skirt at the trailing end is cut along a length of about 2 inches to form strands that may extend beyond the hook by as much as an inch as illustrated. The treble hook as illustrated in FIG. 1 is nearly obscured by the strands to present an appearance that resembles local bait fish.

Figure 2:
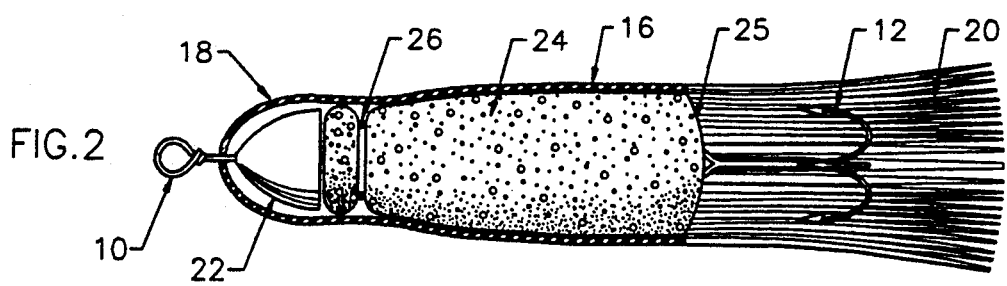
FIG. 2 is a similar view with the outer layer of material partially removed to show the sponge-like member that is tied to enable easy insertion in the outer sleeve.

With reference to FIG. 2, half of the outer sheath 14 has been removed to show lead weight 22 which desirably has the shape of the head of a bait fish. The use of weights which have a generally conical shape are satisfactory. Head shaped weight 22 will be urged tightly against the inside surface of the end 18 of the sheath 14 during assembly and in use and the space shown in the drawings is for purposes of clarification.

Aft of the head shaped weight 22 is a sponge-like material 24 that has been compressed to fill the interior of the sheath 14. A conventional sponge that has a length of about 2 inches, a width of about 0.75 inches and a thickness of about 0.25 inches may be rolled into a cylindrical shape and secured with a band 26 to facilitate the insertion of the sponge 24 into the sheath. Use of the sponge gives a softer feel more nearly resembling the feel of bait fish flesh.

Figure 3:
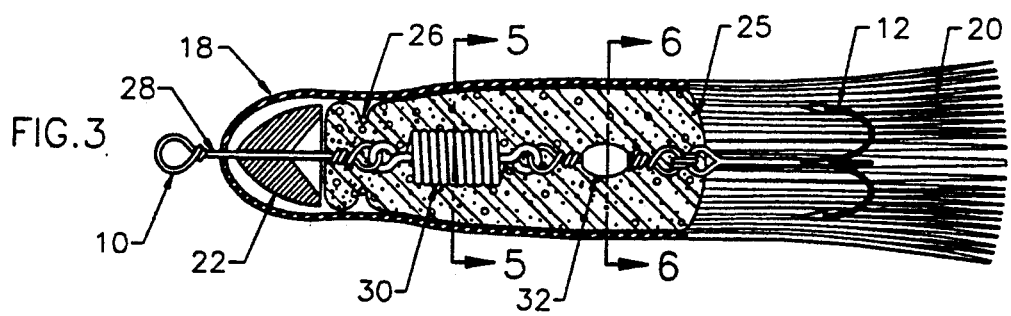
FIG. 3 is a longitudinal view in section that shows the various internal parts of the lure of FIG. 1 according to a first embodiment.
Figure 4:
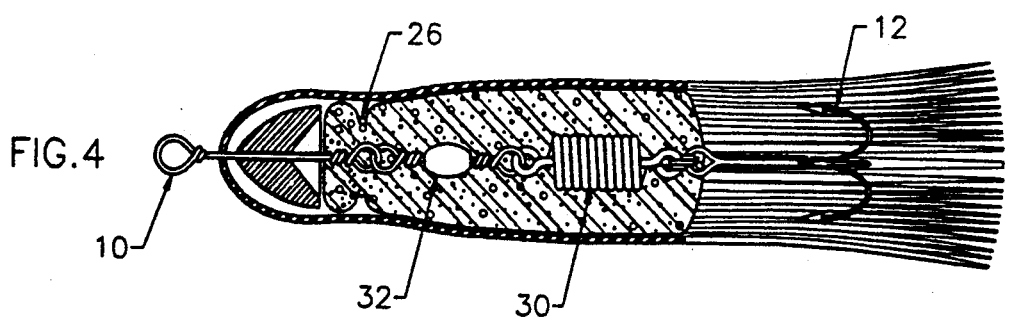
FIG. 4 is a longitudinal view similar to FIG. 3 according to a second embodiment.

Referring now to FIG. 3, half of the sponge is shown removed to better illustrate how the hook 12 is attached to the wire 28 that is formed with loop 10. For best fishing results, hook 12 needs to have a swivel function so that the line does not become entangled after a fish is caught. Also, to allow the use of light tackle and yet not lose the "big" one due to breakage of the line, a coil spring 30 is used to reduce shock loads on the line. The size of the lure is influenced by the need for the swivel 32 and the spring 30 to be connected in series with either the spring 30 first as shown in FIG. 3 or the swivel 32 first as shown in FIG. 4. In either case the tandem combination of the spring 30 and the swivel 32 is surrounded by the sponge 24 which is advantageously tied at its leading end 26 to facilitate assembly. The spring 30 and swivel 32 constitute parts that are connected between the wire 28 and the hook 12.

Figure 5:
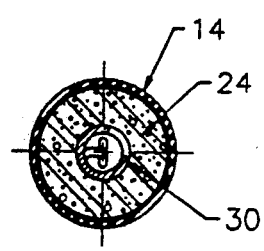
FIG. 5 is an end view in section taken along line 5—5 of FIG. 3.
Figure 6:
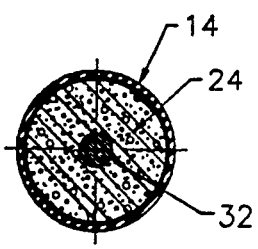
FIG. 6 is an end view in section taken along line 6—6 of FIG. 3.

FIG. 5 shows the sponge material 24 as it surrounds the coil spring 30. FIG. 6 shows the sponge material as it surrounds the swivel 32.

The wire 28 is attached to either the spring 30 or the swivel 32 as by means of a loop as is clear from the illustration in FIGS. 3 and 4. The weight 22 is provided with a central through opening through which wire 28 is passed before loop 10 is formed at the leading end of the lure. Likewise, the outer sheath is slid over the leading end of wire 28, outer surface of the sponge 24 to the position illustrated in FIG. 2 before the loop 10 is formed. The manner of assembly is not critical as variations in the assembly are contemplated which may be dictated by the components that are utilized. For example, the lure may be shortened by omission of the spring 30 or by omission of the swivel for certain applications. However, use of a spring 30 having the shape of a helix as illustrated produces the feel of a rib cage of a bait fish and the presence of the swivel produces the feel of a bait fish spine. The thickness of the sponge 24 therefore should not be too great since one goal is to produce a lure which has to the game fish a feel of a bait fish. To this end it should be noted that weight 22 is not covered by the sponge 24 but only by sock or sheath portion 18 to cause the feel of the head portion on the lure to better resemble the skull of a bait fish.

The skirt 20 preferably extends beyond the hook 12 to mask the hook 12 as much as possible without interfering with its function. The strands which obscure the hook extend from the trailing end of the sponge 24 to permit access to the sponge for application of a fluid fish attractant that is available as a liquid or spray at a position near the hook 12.

While several embodiments of the present invention have been described, other changes and modifications will become apparent to those working in this art. It is intended that all changes that fall within the scope of the claims and any equivalents thereof be covered thereby.

What is claimed is:

1. A fishing lure having a length and shape to provide an appearance resembling that of a bait fish having a head portion and a tail portion and including a fish hook for attachment to a fish line comprising:

a shaped weight at a leading end of the lure which corresponds to the head portion of the bait fish and a fish hook at a trailing end of the lure which corresponds to the tail portion of the bait fish, said hook being attached through an interior portion of the lure to a fish line attaching loop by way of a plurality of parts which include a structure for allowing the hook to swivel with respect to the fish line attaching loop and a tension spring member for absorbing a shock load after a fish is hooked;

a unitary sheath of a soft non-porous synthetic plastics material serving a an outer lure surface which provides a feel similar to that of bait fish flesh, said sheath extending along the length of the lure to surround and obscure the shaped weight, all of said plurality of parts and at least part of the hook; and a layer of porous and resiliently compressible material surrounding said plurality of parts and underlying the sheath, said porous material having an exposed portion accessible at the trailing end of the lure to permit the addition of a fluid fish attractant at a position near the hook, and said porous material together with said sheath forming an outer lure surface which has the feel of a bait fish flesh.

2. The lure as defined in claim 1 wherein the shaped weight has a generally conical shape with a rounded apex positioned near the leading end of the lure; said lure further having a rigid member which extends through an interior portion of the shaped weight to be directly connected to one of said parts along a longitudinal axis of said lure.

3. The lure as defined in claim 1 wherein the unitary sheath has at its trailing end strands which extend longitudinally beyond the end of the fish hook and form the trailing end of the lure.

4. The lure as defined by claim 1 wherein one of said parts is a swivel which has a central body and a pair of attachment loops, one each at opposite ends of the swivel; another of said parts is a coil spring; and said swivel and said spring are connected in series between the fish line and the fish hook with both parts being positioned behind the fish line and at the leading end of the lure.

5. A fishing lure for connection to a fish line comprising:

a fish hook at a trailing end of said lure;

a tension member which extends along a longitudinal axis of said lure and is adapted for connection to a fish line at a leading end of said lure;

a weight shaped to resemble the head of a bait fish having a central opening through which the tension member extends;

parts including a swivel and a spring connected between the tension member and the hook;

a sponge material that is both resilient and porous wrapped around said parts and positioned behind the head shaped weight and having a thickness that softens the hardness of the swivel and spring parts to a touch from a side of the lure;

a unitary sock of a soft, non-porous synthetic resin material which has the feel of fish bait flesh and a leading closed end through which the tension member extends, said sock fitting snugly over the head shaped weight, the sponge material and at least a portion of the hook to serve as the outer surface of the lure and give the lure the general shape, size and feel of a bait fish.

6. The lure as defined in claim 5 wherein the sponge material is in the form of a rectangular slab that has been rolled around the swivel and spring parts, constricted at a leading end portion just aft of said head shaped weight and opposite sides of the slab that lie parallel to the longitudinal axis of the lure are held in a position to allow insertion of the rolled sponge material into the interior of said sheath.

7. The lure as defined in claim 6 wherein the sheath has a trailing end that has been cut to form strands that extend beyond the end of the hook and make accessible an aft end of the sponge material for application of a liquid fish attractant near the trailing end of said lure.

* * * * *